(12) United States Patent
Wang

(10) Patent No.: US 10,791,379 B2
(45) Date of Patent: Sep. 29, 2020

(54) VIDEO PROCESSING METHOD AND APPARATUS, AND COMPUTER STORAGE MEDIUM

(71) Applicant: Tencent Technology (Shenzhen) Company Limited, Shenzhen, Guangdong (CN)

(72) Inventor: Cong Wang, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 55 days.

(21) Appl. No.: 15/975,141

(22) Filed: May 9, 2018

(65) Prior Publication Data

US 2018/0262815 A1 Sep. 13, 2018

Related U.S. Application Data

(63) Continuation of application No. PCT/CN2017/074696, filed on Feb. 24, 2017.

(30) Foreign Application Priority Data

Mar. 24, 2016 (CN) .......................... 2016 1 0176356

(51) Int. Cl.
*H04N 7/173* (2011.01)
*H04N 21/647* (2011.01)
(Continued)

(52) U.S. Cl.
CPC ..... *H04N 21/64776* (2013.01); *H04N 19/172* (2014.11); *H04N 19/65* (2014.11);
(Continued)

(58) Field of Classification Search
CPC .......... H04N 21/64776; H04N 19/895; H04N 21/2187; H04N 21/643; H04N 21/654
See application file for complete search history.

(56) References Cited

U.S. PATENT DOCUMENTS

2007/0058730 A1* 3/2007 Bowra ............... H04N 21/2389
375/240.28
2008/0141091 A1* 6/2008 Kalluri ............. H04N 21/43615
714/748
(Continued)

FOREIGN PATENT DOCUMENTS

CN 101288315 A 10/2008
CN 101894558 A 11/2010
(Continued)

OTHER PUBLICATIONS

International Search Report and Written Opinion dated Apr. 27, 2017 for PCT Application No. PCT/CN2017/074696, 20 pages.
(Continued)

*Primary Examiner* — Kyu Chae
(74) *Attorney, Agent, or Firm* — Brinks Gilson & Lione

(57) ABSTRACT

A video processing method, video processing apparatus, and a computer storage medium are also disclosed for implementing a solution for compensating for lost video frames that are lost during transmission. Lost video frame detection and compensation is implemented by separately numbering each video frame, at a data layer of transmission, with no need to perform additional encoding/decoding calculation, and without increasing a load of a server during lost frame compensation. A lost video frame is compensated for by inserting a compensation video frame after the lost video frame is detected, so as to ensure that a total quantity of video frames is not changed, thereby avoiding stalling at the playback end during a playback process because the quantity of video frames decreases, and ensuring smooth watching during video playback.

12 Claims, 11 Drawing Sheets

(51) Int. Cl.
     *H04N 19/895*    (2014.01)
     *H04N 19/172*    (2014.01)
     *H04N 19/65*     (2014.01)
     *H04N 21/4402*   (2011.01)
     *H04N 21/442*    (2011.01)
     *H04N 21/2187*   (2011.01)
     *H04N 21/643*    (2011.01)
     *H04N 21/654*    (2011.01)

(52) U.S. Cl.
     CPC ....... *H04N 19/895* (2014.11); *H04N 21/2187* (2013.01); *H04N 21/44209* (2013.01); *H04N 21/440245* (2013.01); *H04N 21/440281* (2013.01); *H04N 21/643* (2013.01); *H04N 21/654* (2013.01)

(56)            References Cited

U.S. PATENT DOCUMENTS

2008/0259799 A1* 10/2008 van Beek ............ H04L 47/2416
                                                      370/235
2009/0323826 A1   12/2009 Wu et al.
2010/0037281 A1*  2/2010 Bennett .............. H04N 21/4425
                                                      725/127
2010/0177776 A1*  7/2010 Crinon ................ H04L 12/6418
                                                      370/394
2016/0105689 A1*  4/2016 Sorlander .......... H04N 21/6143
                                                    375/240.27
2017/0126849 A1*  5/2017 Herrero ................. H04L 69/22

FOREIGN PATENT DOCUMENTS

CN         103873873 A      6/2014
CN         107231563 A      10/2017
EP           0642273 A2     3/1995
KR       20090050196 A      5/2009

OTHER PUBLICATIONS

Office Action dated May 18, 2018 for Chinese Application No. 201610176356.X with concise English Translation, 7 pages.

* cited by examiner

VIDEO PROCESSING METHOD AND APPARATUS, AND COMPUTER STORAGE MEDIUM

CROSS-REFERENCE TO RELATED APPLICATION(S)

This application is a continuation of International Patent Application No. PCT/CN2017/074696, filed on Feb. 24, 2017, which claims benefit to Chinese Patent Application No. 201610176356X, filed with the State Intellectual Property Office of the People's Republic of China on Mar. 24, 2016, the entirety of all of which are hereby incorporated by reference herein.

FIELD OF THE TECHNOLOGY

The present disclosure relates to data transmission technologies, and in particular, to a video processing method and apparatus, and a computer storage medium.

BACKGROUND OF THE DISCLOSURE

Online video playback has a relatively high requirement on real-time quality of a video stream. Network fluctuation during a video data stream transmission process may cause loss of some video frame data. If a user waits again for retransmission of the lost data, real-time quality of online video watching and watching quality are adversely affected.

Currently, for data loss during a data transmission process, a processing manner includes a compensation solution for frame loss of Voice over Internet Protocol (VoIP), where compensation is implemented by retransmitting a lost audio frame after obtaining the lost audio frame for a plurality of times, and then performing tandem encoding/decoding calculation. Because an audio bit rate is relatively low and encoding/decoding requires a relatively small processor overhead, there is a relatively small increase in a load. However, for a video, a bit rate is quite high and encoding/decoding calculation is quite complex. Generally, a 64-core server can only encode a 2-channel H.265 video and a 16-channel H.264 video. Because a quantity of online video playback channels usually exceed tens of thousands, compensation by means of tandem encoding/decoding requires a large amount of processor resources overhead on the server. Therefore, the lost video frame data is usually directly discarded. The manner of directly discarding the lost video frame data generally causes the following two problems.

First, loss of the video frame directly causes artifacts appearing on a screen when a user watches a video.

Second, because of the loss of the video frame, a playback speed of a video on a client's playback device may be faster than an actual playback speed of the video, and playback of buffered data is completed earlier. Consequently, the client stalls and performs tandem loading, which causes tandem buffering or even an error.

In related technologies, there is no effective solution yet for the foregoing problems.

SUMMARY

Therefore, it is necessary to provide a video processing method and apparatus, and a computer storage medium, so as to reduce video frame loss and improve a video display effect.

A video processing method is provided, including: obtaining a video frame queue that is formed by separately numbering each video frame; transmitting the video frame queue and detecting whether a frame in the video frame queue is lost; compensating for the lost frame by inserting a compensation frame if the frame in the video frame queue is lost; and sending the video frame queue after compensation to a playback end.

A video processing apparatus is provided, including: a video frame obtaining module, configured to obtain a video frame queue that is formed by separately numbering each video frame; a detection module, configured to: transmit the video frame queue and detect whether a frame in the video frame queue is lost; a compensation module, configured to compensate for the lost frame by inserting a compensation frame when the frame in the video frame queue is lost; and a sending module, configured to send the video frame queue after compensation to a playback end.

A computer storage medium is provided, the computer storage medium storing computer programs, and the computer programs being configured to perform the foregoing video processing method.

According to the foregoing video processing method and apparatus, and the computer storage medium, each video frame is transmitted after being separately numbered, and lost frame detection and compensation are implemented during a process of transmitting a video frame queue, so as to implement lost frame detection and compensation at a data layer. Therefore, additional encoding/decoding calculation does not need to be performed, and a load of a server is not increased during a lost frame compensation process. A lost frame is compensated for by inserting a compensation frame after the lost frame is detected, so as to ensure that a total quantity of video frames is not changed, thereby avoiding stalling at a playback end during a playback process because the quantity of video frames decreases, and ensuring smooth watching at the playback end.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Unless otherwise defined, meanings of all technical and scientific terms used in this specification are the same as that usually understood by a person skilled in the technical field to which the present disclosure belongs. In this specification, terms used in the specification of the present disclosure are merely intended to describe objectives of the specific embodiments, but are not intended to limit the present disclosure. A term "and/or" used in this specification includes any or all combinations of one or more related listed items.

Figure 1:
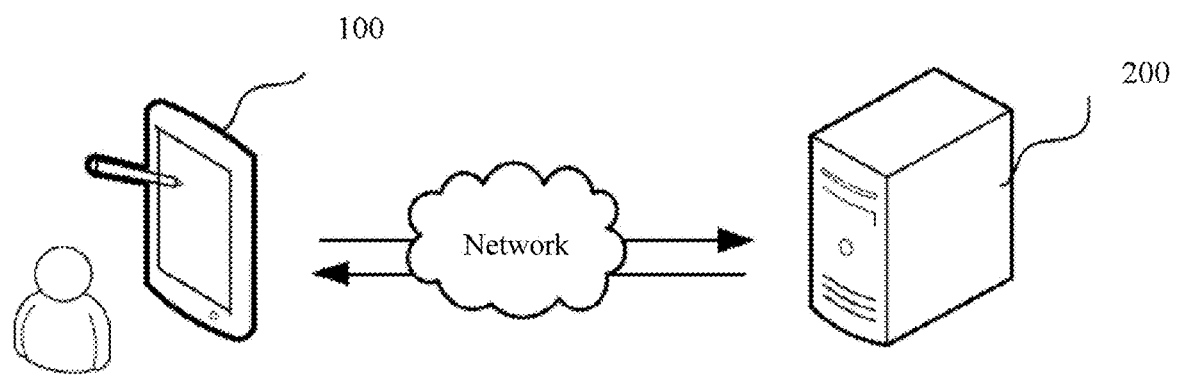
FIG. 1 shows a system architectural diagram of a video processing method according to an embodiment.

A video processing method provided in an embodiment of the present disclosure may be applied to a system shown in FIG. 1. As shown in FIG. 1, a server 200 communicates with a terminal 100 by means of a network. Various video playback applications are installed and run on the terminal 100. The terminal 100 generates an association request for a video played online by means of a video playback application, and sends the association request to the server 200 by means of the network. The terminal 100 includes but is not limited to a smartphone, a tablet computer, a personal digital assistant (PDA), a laptop computer, and a desktop computer. The server 200 responds to a playback request of the terminal 100, obtains a video file collected by a video collection apparatus, encodes the video file, and then transmits the video file to the terminal 100.

Figure 2:
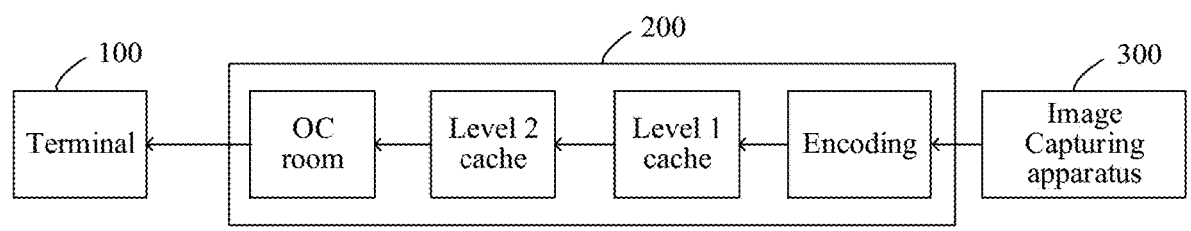
FIG. 2 shows an architectural diagram of a live video according to an embodiment.

The server 200 may be an independent physical server or a physical server cluster. Using a live video as an example, as shown in FIG. 2, a typical live video architecture includes four parts, that is, live shooting, video encoding, video transmission acceleration, and display at a playback end. A video file is captured by using an image capturing apparatus 300. The video file is encoded to form video frames subject to a transmission protocol. Internal network nodes for video transmission acceleration include a level 1 cache, a level 2 cache, and an optical carrier (OC) room. The level 1 cache refers to an Internet data center (IDC) room closest to an encoding end, and is for first-level proxy transmission of a live video. The level 2 cache refers to a data center (DC) or a large OC room in major cities in various regions. The OC room refers to a node closest to a playback end, and is for last-kilometer acceleration before the video file arrives at the playback end. The server 200 of the system shown in FIG. 1 includes one of or any combination of servers included in the level 1 cache, the level 2 cache, and the OC room in the video live architecture.

Figure 3:
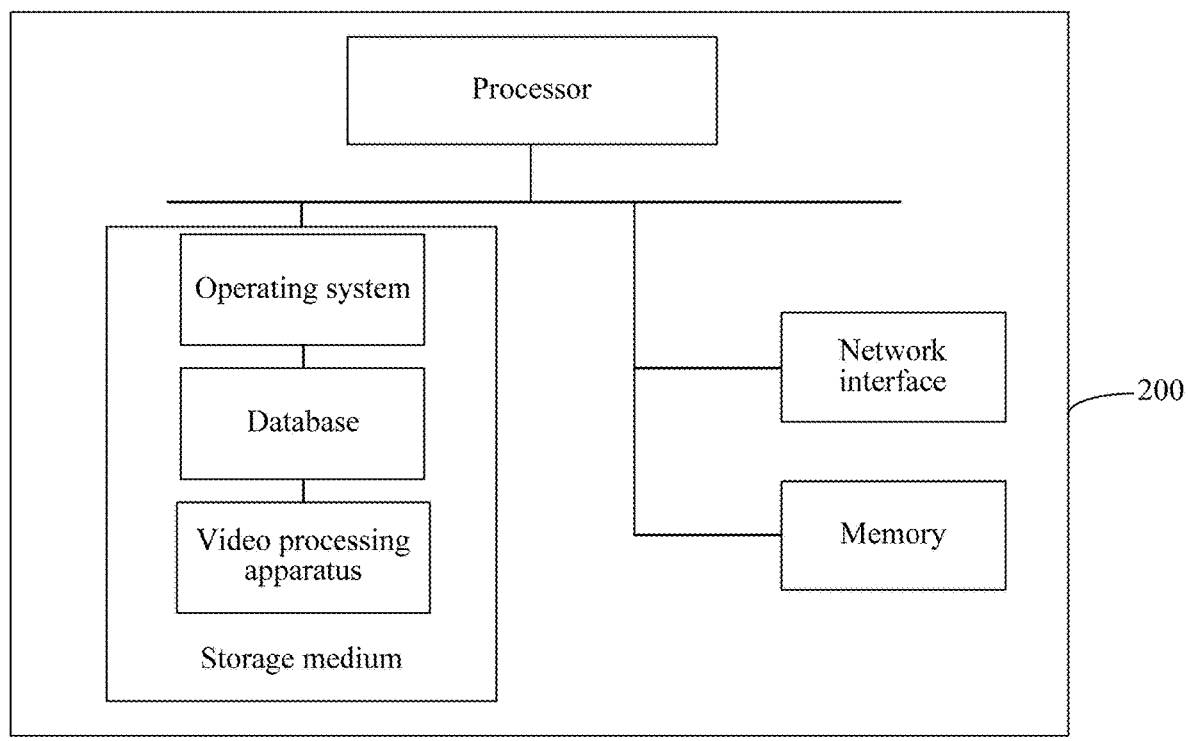
FIG. 3 shows a schematic diagram of an internal structure of a server according to an embodiment.

In an embodiment, an internal structure of the server 200 in FIG. 1 is shown in FIG. 3, and the server 200 includes a processor, a storage medium, a memory, and a network interface that are connected by using a system bus. An operating system, a database, and a video processing apparatus are stored in the storage medium of the server 200. The database is configured to store data such as a video frame queue. The processor of the server 200 is configured to provide a calculation and controlling capability, to support running of the entire server 200. The memory of the server 200 provides an environment for running of the video processing apparatus in the storage medium. The network interface of the server 200 is configured to communicate with the terminal 100 by means of network connection, for example, receive an online video playback request sent by the terminal 100.

Figure 4:
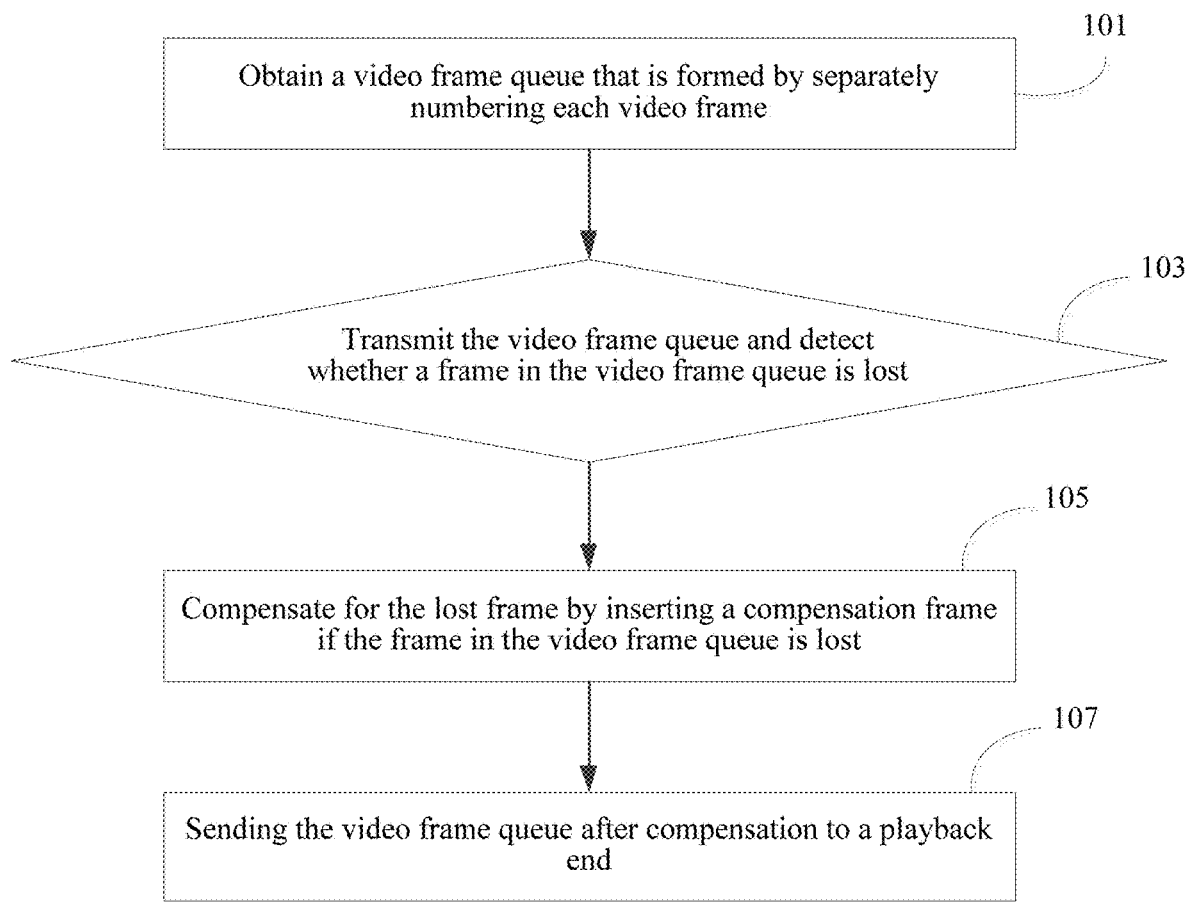
FIG. 4 shows a flowchart of a video processing method according to an embodiment.

As shown in FIG. 4, in an embodiment, a video processing method is provided. The method can be applied to a server 200 shown in FIG. 2, and includes the following steps:

Step 101: Obtain a video frame queue that is formed to include a plurality of video frames that are each separately numbered. The video frame queue that is formed by separately numbering each video frame refers to a queue formed by video frames obtained by numbering each video frame by means of protocol expansion in an encoding process in which a corresponding collected video is encoded according to an online video playback request of a terminal. Separately numbering each video frame refers to establishing a sequential correspondence between numbers and the video frames, to form a set law. For example, each video frame is numbered by using a digital sequence number according to a chronological order in which the video frames are generated, so that the digital sequence number corresponds to the video frame in the video frame queue; or each video frame is numbered by using a letter according to a chronological order in which the video frames are generated, so that the letter corresponds to the video frame in the video frame queue.

Step 103: Transmit the video frame queue and detect whether a frame in the video frame queue is lost.

The video frames in the video frame queue are separately numbered. Therefore, it may be detected, during a process of transmitting the video frame queue, whether numbers of the frames are subject to the set correspondence between the numbers and the video frames in the video frame queue after encoding, to determine whether a frame in the video frame queue is lost. If the video frame queue is obtained by numbering each video frame by using a digital sequence number according to a chronological order in which the video frames are generated, it may be determined whether a frame is lost by determining whether the digital sequence numbers are sequential. If the video frame queue is obtained by numbering each video frame by using a letter according to a chronological order in which the video frames are generated, it may be determined whether a frame is lost by determining whether the letters are arranged still according to an originally set law.

Step 105: Compensate for the lost frame by inserting a compensation frame if the frame in the video frame queue is lost.

A video frame used to replace the lost frame in the video frame queue is a compensation frame. When it is determined that there is frame loss, compensation frames of which a quantity is the same as a quantity of the lost frames are inserted at positions of the lost frames for compensation. A length of the video frame queue after compensation is the same as a length of the original video frame queue, and an order of other video frames that are not lost in the video frame queue is not changed.

step 107: Send the video frame queue after compensation to a playback end.

The compensation frames are inserted at positions of the lost frames. In this way, it is ensured that a total quantity of the video frames in the video frame queue is not changed, and an order of the video frame that are not lost is not affected. Therefore, after the video frame queue after compensation is sent to the playback end, a playback duration is not changed.

In the video processing method provided in this embodiment, each video frame is separately numbered by encoding and then transmitted. During a data transmission process, it is detected whether a video frame is lost, and compensation is performed if the video frame is lost, so as to implement lost frame detection and compensation at a data layer, with no need to perform additional encoding/decoding calculation, and without increasing a load of a server. In addition, A lost frame is compensated for by inserting a compensation frame after the lost frame is detected, so as to ensure that a total quantity of video frames is not changed and avoid stalling caused by a decrease in the quantity of the video frames, thereby avoiding playback failure because of a playback speed of a playback end that exceeds a speed at which an online video is generated, and ensuring smooth watching at the playback end and quality of a playback image. The video processing method is applicable to frame loss processing when a large quantity of users request to watch online videos by using various video playback applications on a terminal. In particular, for an application for watching online live videos, the method can reduce stalling and tandem loading, without increasing a load of a server.

Figure 5:
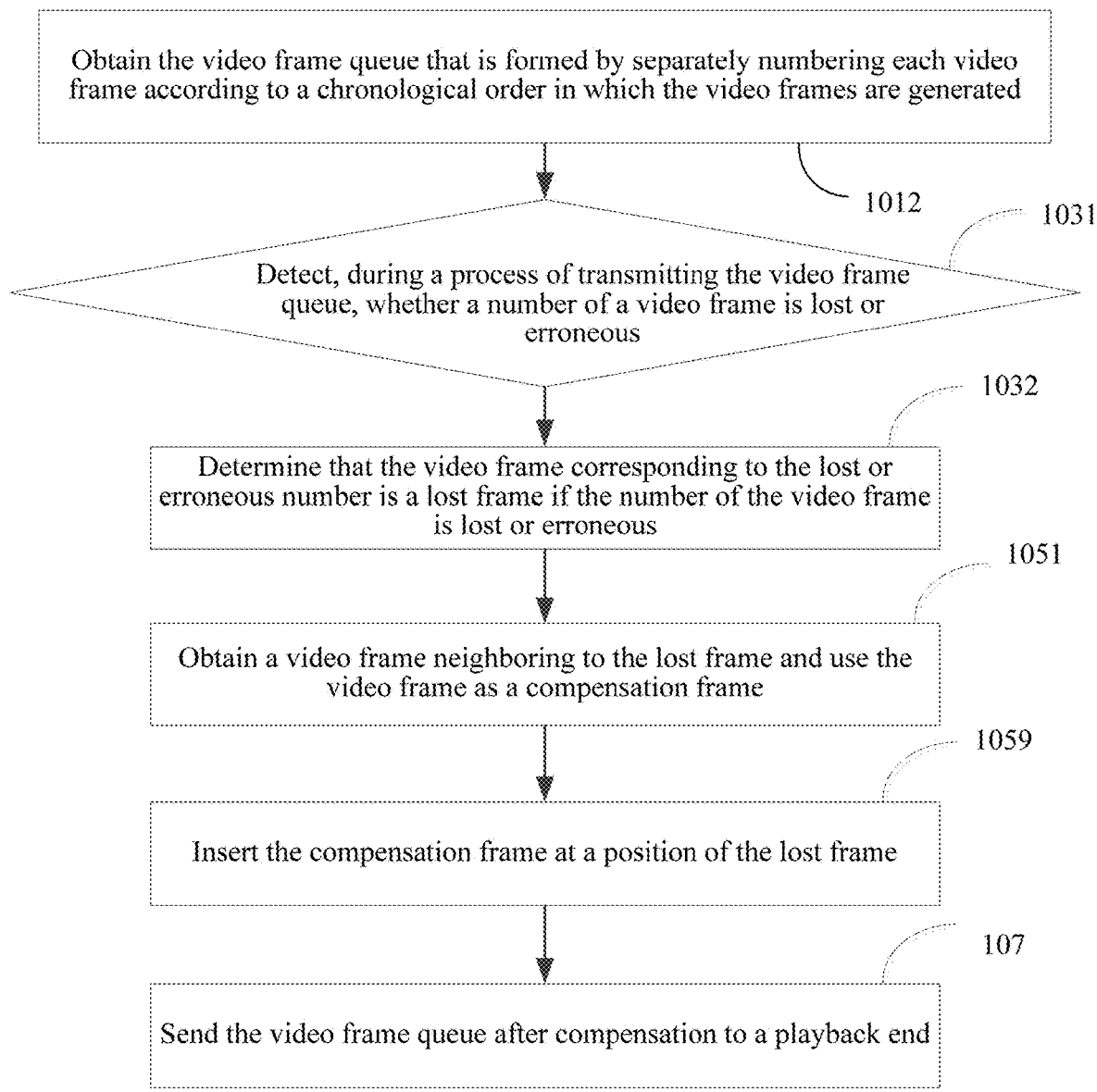
FIG. 5 shows a flowchart of a video processing method according to another embodiment.

In another embodiment, as shown in FIG. 5, in step 101, the step of obtaining a video frame queue that is formed by separately numbering each video frame includes:

Step 1012: Obtain the video frame queue that is formed to include a plurality of video frames that are each separately numbered according to a chronological order in which the video frames are generated.

In step 103, the step of transmitting the video frame queue and detecting whether a frame in the video frame queue is lost includes:

Step 1031: Detect, during a process of transmitting the video frame queue, whether a number of the video frame is lost or erroneous.

Step 1032: Determine that the video frame corresponding to the lost or erroneous number is a lost frame if the number of the video frame is lost or erroneous.

A video played online and watched by means of a network generally transmits a video file obtained by capturing video in a form of streaming media data (e.g., an flv file). The video file may be converted to the streaming media data by using an encoder or a computer on which encoding software is installed. Encoding refers to creating, capturing, and editing audio/video multimedia data to form a video frame in a streaming media format convenient for network transmission. The video file is encoded according to the fly transmission protocol. During an encoding process, a video protocol head is added to each video frame by means of protocol expansion. After encoding, each video frame includes a video protocol head and a tag. The tag is video content. The video protocol heads are separately numbered according to a preset rule to form identifiers, so as to form a video frame queue in which each frame can be identified. Each video frame is separately numbered according to a chronological order in which the video frames are generated, that is, the video file that needs to be transmitted is transmitted after being converted to the video frame queue in which each frame can be separately identified.

A video protocol head is added to each video frame, and is numbered to be used as an identifier. It may be determined whether a frame in the queue is lost or displaced by detecting a number of the video protocol head of the frame. For example, each video frame is numbered by using a digital sequence number sequentially and in ascending order according to a chronological order in which the video frames are generated, to obtain a video frame queue. When the digital sequence numbers are not sequential or any two subsequent digital sequence numbers are not arranged in ascending order, it may be determined that a frame at a corresponding position is lost and a number corresponding to the position is confirmed. For example, in a normal case, numbers of frame heads in a video frame queue after encoding are respectively "1, 2, 3, 4, 5, . . . , 29, 30, . . . ". During a video frame transmission process, it is detected that numbers corresponding to the video frame queue are "1, 2, 3, 5, . . . , 29, 30, . . . ", and it indicates that the fourth frame is lost. Accordingly, it may be determined that a frame is lost, and that the fourth frame is the lost frame. For another example, in a normal case, numbers of frame heads in a video frame queue after encoding are respectively "1, 2, 3, 4, 5, . . . , 29, 30, . . . ". During a video frame transmission process, it is detected that numbers corresponding to the video frame queue are "1, 2, 3, 5, . . . , 29, 4, 30, . . . ". It indicates that the fourth frame is displaced, and the fourth frame arrives after the twenty-ninth frame is played. Therefore, the fourth frame cannot be used and is not arranged according to the preset ascending law. Accordingly, it may be determined that a frame is lost, and that the fourth frame is the lost frame.

Further, in step 105, the step of compensating for the lost frame by inserting a compensation frame includes:

Step 1051: Obtain a video frame neighboring to the lost frame and use the video frame as a compensation frame.

Step 1059: Insert the compensation frame at a position of the lost frame.

The video frame neighboring to the lost frame is used as a compensation frame, and the compensation frame is inserted at the position of the lost frame to form the video frame queue after compensation, so as to keep a length of the original video frame queue. Generally, an information difference between neighboring video frames is relatively small. A neighboring video frame is obtained and used as a compensation frame, and the compensation frame is inserted at a position of a corresponding lost frame, to generate the video frame queue after compensation. After the video frame queue after compensation is sent to a playback end, when the compensation frame at the position of the lost frame arrives during playback according to a chronological order in which the video frames are generated, a playback duration of a frame is prolonged by the playback duration of the same frame. Therefore, watching experience is not affected because the video watched by a user is smoothly played on the whole and the user does not need to wait for retransmission.

Figure 6:
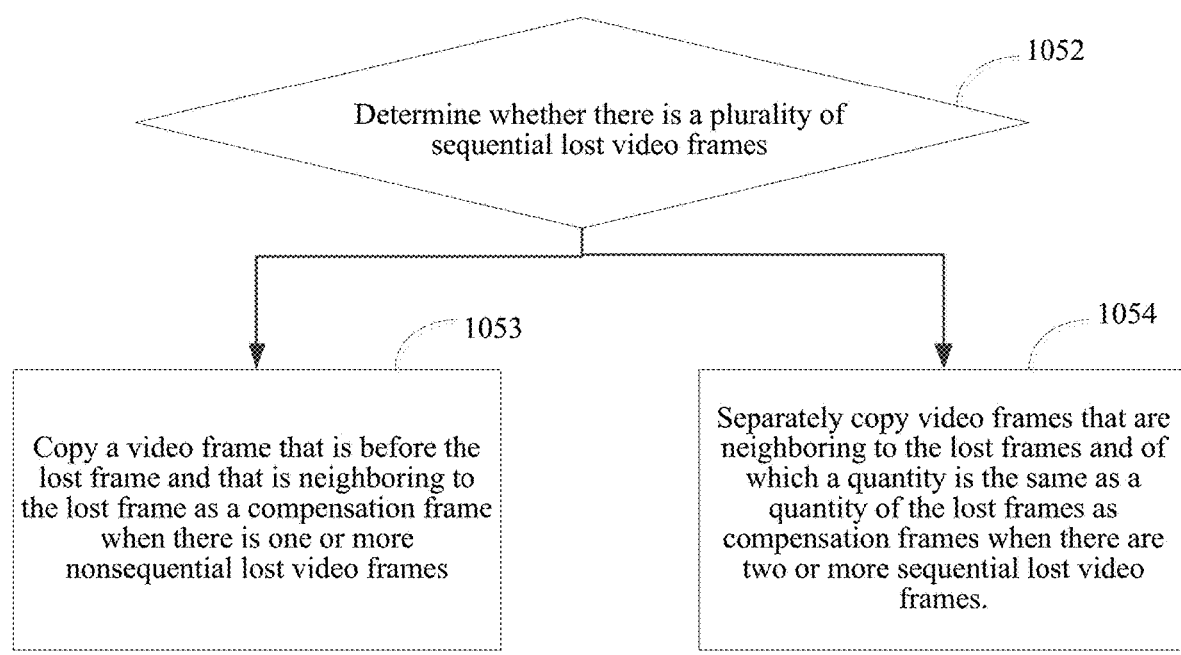
FIG. 6 shows a flowchart of obtaining a compensation frame according to an embodiment.

Referring to FIG. 6, a preferred embodiment showing how to obtain a compensation frame is provided. In step 1051, the step of obtaining a video frame neighboring to the lost frame and using the video frame as a compensation frame includes:

Step 1052: Determine whether there is a plurality of sequential lost video frames.

Step 1053: Copy a video frame that is before the lost frame and that is neighboring to the lost frame as a compensation frame when there is one or more nonsequential lost video frames.

Step 1054: Separately copy video frames that are neighboring to the lost frames and of which a quantity is the same as a quantity of the lost frames as compensation frames when there is a plurality of sequential lost video frames.

When there is one or more nonsequential lost video frames, a priority for a frame before a lost frame is a rule for copying a video frame neighboring to the lost frame as a compensation frame. That is, a video frame that is before the lost frame and that is neighboring to the lost frame is selected in priority, and is copied as a compensation frame. The nonsequential video frames mean that the lost frames are not sequential. For example, each video frame is numbered by using a digital sequence number sequentially and in ascending order according to a chronological order in which the video frames are generated, to obtain a video frame queue. For example, during a video frame transmission process, it is detected that numbers corresponding to the video frame queue are "1, 2, 3, 5, . . . , 29, 30, . . . ", and it is determined that the fourth frame is the lost frame. According to the rule of a priority for a frame before a lost frame, the third frame that is neighboring to the fourth frame and that is before the fourth frame is copied and inserted at a position of the fourth frame for compensation. The video frame queue after compensation is "1, 2, 3, 3, 5, . . . , 29, 30, . . . ". For another example, during a video frame transmission process, it is detected that numbers corresponding to the video frame queue are "1, 3, 5, . . . , 29, 30, . . . ". It indicates that the second frame and the fourth frame are lost, and it is determined that the second frame and the fourth frame are the lost frames. According to the rule of a priority for a frame before a lost frame, the first frame and the third frame are separately copied and inserted at positions of the second frame and the fourth frame, to compensate for the lost frames. The video frame queue after compensation is "1, 1, 3, 3, 5, . . . , 29, 30, . . . ".

When there is a plurality of sequential lost video frames, video frames that are neighboring to the lost frames and of which a quantity is the same as a quantity of the lost frames are separately copied as compensation frames. A priority for a frame closest to a lost frame and a priority for a frame before a lost frame are rules for selecting video frames neighboring to the lost frames. That is, neighboring video frames before the lost frames and after the lost frames are separately selected in priority, and are copied as compensation frames, a quantity of the neighboring video frames before or after the lost frames is the same as that of the lost frames, so as to ensure that a same video frame appears sequentially for two times at most in the video frame queue after compensation by copying video frames neighboring to the lost frames and inserting the copied video frames separately at positions of the lost frames. For example, during a video frame transmission process, it is detected that numbers of video frames in the video frame queue are "1, 2, 3, 6, . . . , 29, 30, . . . ". It is determined that the fourth frame and the fifth frame are the lost frames. According to the rules of a priority for a frame closest to a lost frame and a priority for a frame before a lost frame, the third frame before the fourth frame and the sixth frame after the fifth frame are separately copied and inserted at positions of the fourth frame and the fifth frame for compensation. The video frame queue after compensation is "1, 2, 3, 3, 6, 6, . . . , 29, 30, . . . ". For another example, during a video frame transmission process, it is detected that numbers of video frames in the video frame queue are "1, 2, 3, 7, 8, . . . , 29, 30, . . . ". It is determined that the fourth frame, the fifth frame, and the sixth frame are the lost frames. According to the rules of a priority for a frame closest to a lost frame and a priority for a frame before a lost frame, the second frame, the third frame, and the seventh frame are separately copied as compensation frames. The video frame queue after compensation is "1, 2, 2, 3, 3, 7, 7, 8, . . . , 29, 30, . . . ".

A quantity of the lost frames and whether the lost frames are sequential are determined, and then neighboring video frames are determined and copied as compensation frames, so as to ensure, to a maximum extent, that a video is smoothly played when the video frame queue after compensation is sent to a playback end for playback, and that there is no obvious discontinuity during video content playback.

Figure 7:
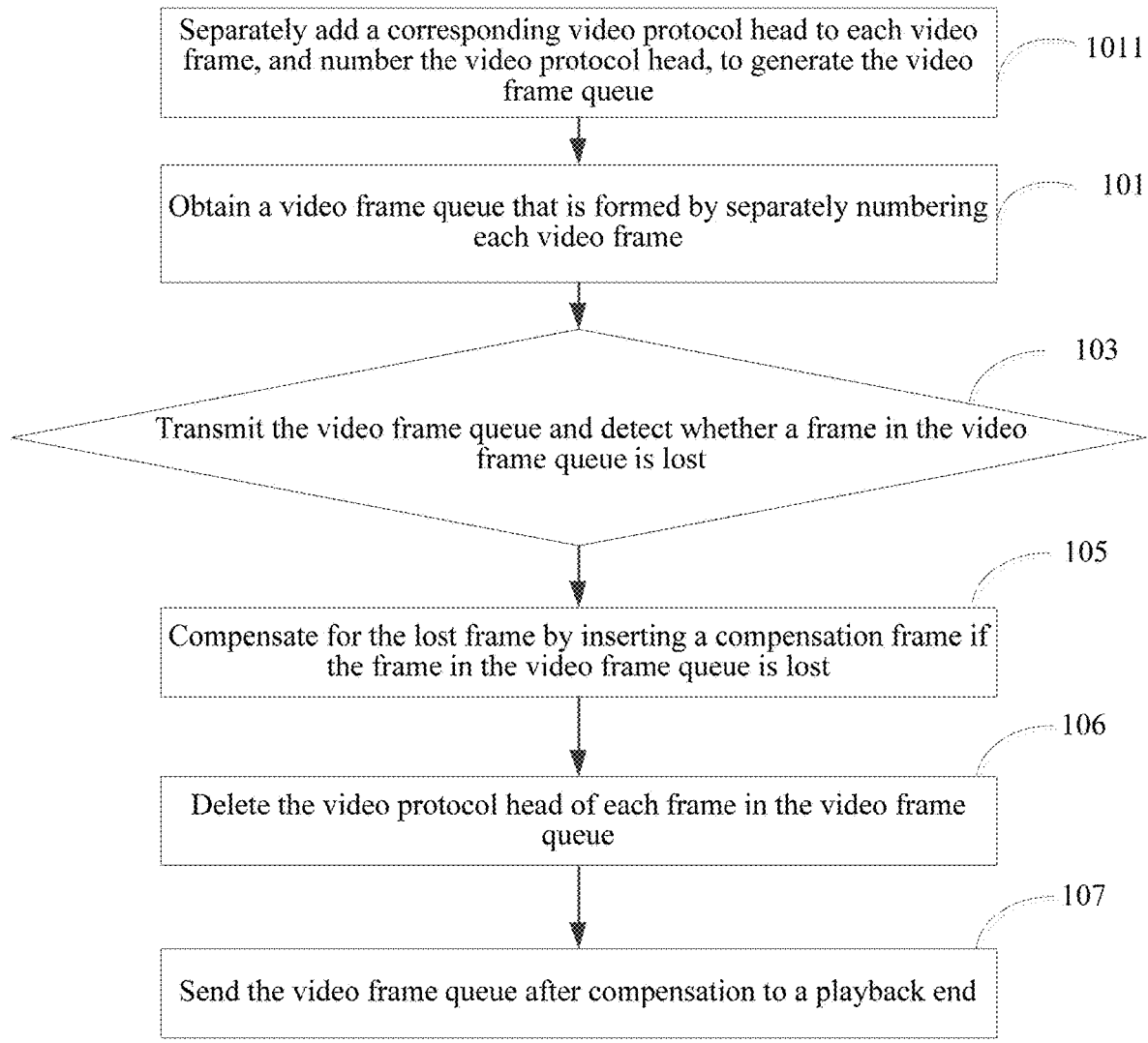
FIG. 7 shows a flowchart of a video processing method according to still another embodiment.

In still another embodiment, referring to FIG. 7, in step 101, before the step of obtaining a video frame queue that is formed by separately numbering each video frame, the method further includes:

Step 1011: Separately add a corresponding video protocol head to each video frame, and number the video protocol head, to generate the video frame queue.

Audio/video data may be encoded after being obtained by means of an audio/video data interface. A corresponding video protocol head is added to each frame by encoding the video. Preferably, the audio/video data is a live video. The live video may be collected by means of live shooting by using a photographing apparatus.

In step 107, before the sending the video frame queue after compensation to a playback end, the method further includes:

Step 106: Delete the video protocol head of each frame in the video frame queue.

Before the video frame queue is sent to the playback end, an original video format is obtained by deleting the video protocol head. Therefore, normal playback of the playback end can be ensured with no need to make any modification at the playback end and with no need to perform updating by the user.

The video processing method may be used in combination with another method for reducing frame loss. For example, by means of optimization of a network protocol stack, when there is packet loss, a transmission speed can still be ensured; and by means of an intelligent route detection technology, an optimal route is selected to avoid using a path with much packet loss. In addition, video frames are distinguished according to a self-defined protocol, and compensation is directly performed on video frames, so as to further perform lost frame compensation when lightweight frame loss cannot be avoided by using another method for reducing frame loss. Compensation is performed at the data layer, with no need to perform additional encoding/decoding and without increasing a load of the server. Lost frame compensation is performed by means of frame insertion by using a copied neighboring video frame. When the video frame queue after compensation is sent to the playback end for playback, a visual and audio effect of the video is superior to that of the video when frame loss occurs and is not compensated for. Lost frame compensation ensures that a total quantity of video frames is not changed, and ensures a video playback speed of the playback end. For an online network video, and in particular, a live video, because of a decrease in a quantity of video frames caused by frame loss, the playback speed of the playback end may exceed a speed at which a live signal is generated, causing a playback failure. By means of the foregoing video processing method, normal smooth playback of the live video can be ensured.

Figure 8:
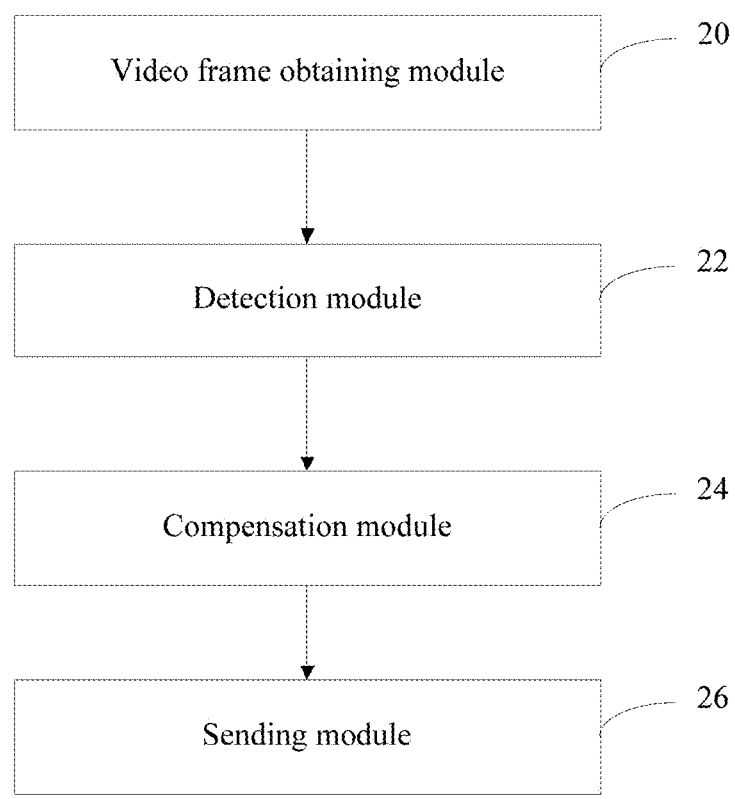
FIG. 8 shows a schematic structural diagram of a video processing apparatus according to an embodiment.

As shown in FIG. 8, in an embodiment, a video processing apparatus is provided, including a video frame obtaining module 20, a detection module 22, a compensation module 24, and a sending module 26. The video frame obtaining module 20 is configured to obtain a video frame queue that is formed by separately numbering each video frame. The detection module 22 is configured to: transmit the video frame queue and detect whether a frame in the video frame queue is lost. The compensation module 24 is configured to compensate for the lost frame by inserting a compensation frame when the frame in the video frame queue is lost. The sending module 26 is configured to send the video frame queue after compensation to a playback end. For purposes of this disclosure, a module may be comprised of the software, hardware, and/or circuitry for implementing the corresponding described features attributed to the module.

Figure 9:
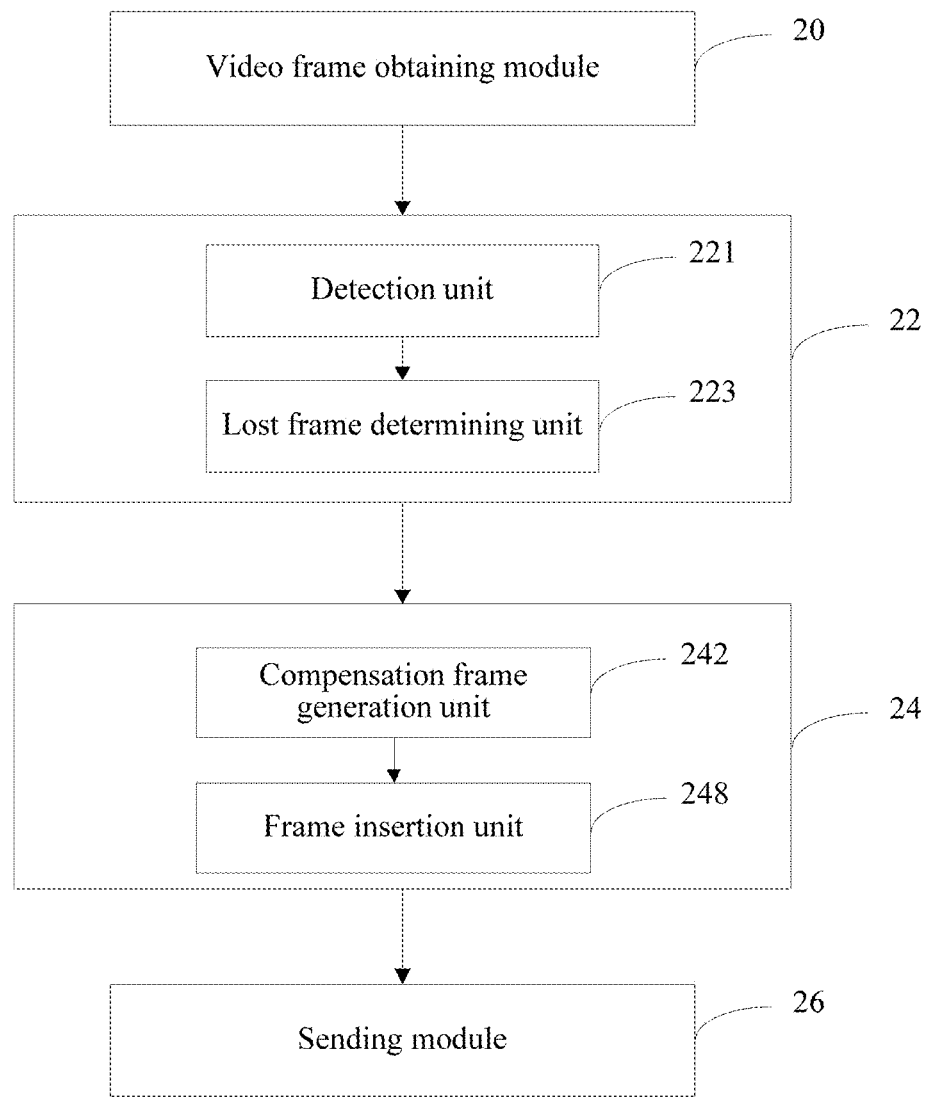
FIG. 9 shows a schematic structural diagram of a video processing apparatus according to another embodiment.

In another embodiment, as shown in FIG. 9, the video frame obtaining module 20 is further configured to obtain a video frame queue formed to include a plurality of video frames that are each separately numbered according to a chronological order in which the video frames are generated. The detection module 22 specifically includes a detection unit 221 and a lost frame determining unit 223. The detection unit 221 is configured to detect, during a process of transmitting a video frame queue, whether a number of a video frame is lost or erroneous. The lost frame determining unit 223 is configured to determine, when it is detected that a video frame is lost or displaced, that the video frame corresponding to the lost or erroneous number is the lost frame.

Further, the compensation module 24 includes a compensation frame generation unit 242 and a frame insertion unit 248. The compensation frame generation unit 242 is configured to obtain a video frame neighboring to the lost frame and use the video frame as a compensation frame. The frame insertion unit 248 is configured to insert the compensation frame at a position of the lost frame.

Figure 10:
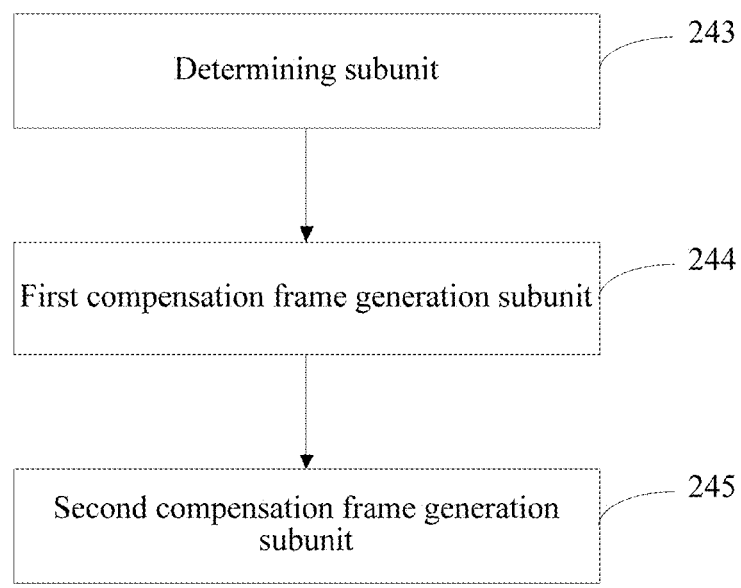
FIG. 10 shows a schematic structural diagram of a compensation module according to an embodiment.

Referring to FIG. 10, in an embodiment, the compensation frame generation unit 242 specifically includes a determining subunit 243, a first compensation frame generation subunit 244, and a second compensation frame generation subunit 245. The determining subunit 243 is configured to determine whether there is a plurality of sequential lost video frames. The first compensation frame generation subunit 244 is configured to copy a video frame that is before the lost frame and that is neighboring to the lost frame as a compensation frame when there is one or more nonsequential lost video frames. The second compensation frame generation subunit 245 is configured to separately copy video frames that are neighboring to the lost frames and of which a quantity is the same as a quantity of the lost frames as compensation frames when there are two or more sequential lost video frames.

Figure 11:
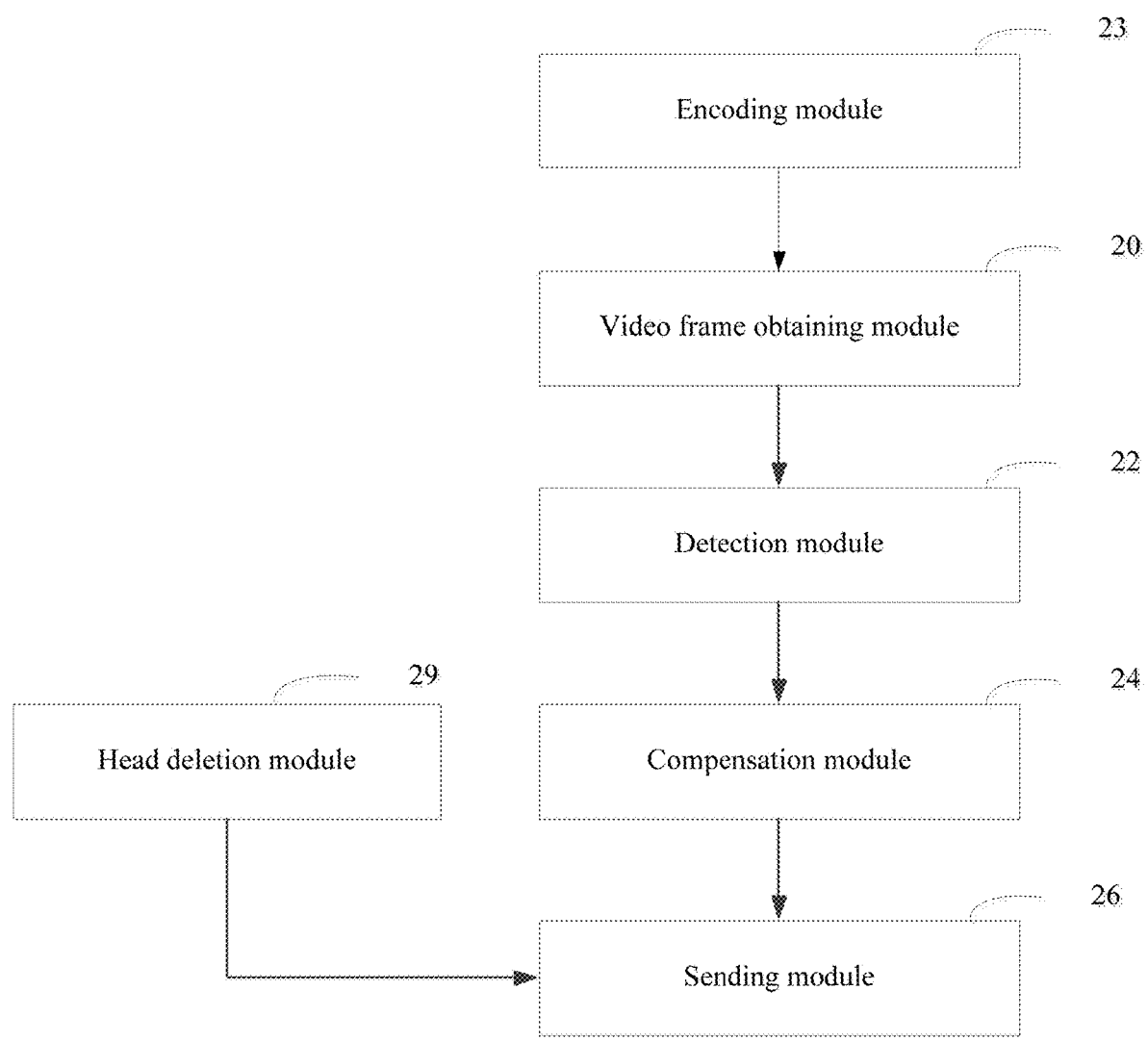
FIG. 11 shows a schematic structural diagram of a video processing apparatus according to still another embodiment.

In still another embodiment, referring to FIG. 11, the video processing apparatus further includes an encoding module 23 and a head deletion module 29. The encoding module 23 is configured to: separately add a corresponding video protocol head to each video frame, and number the video protocol head, to form the video frame queue. The head deletion module 29 is configured to delete the video protocol head of each frame in the video frame queue before the sending the video frame queue after compensation to a playback end.

Figure 12:
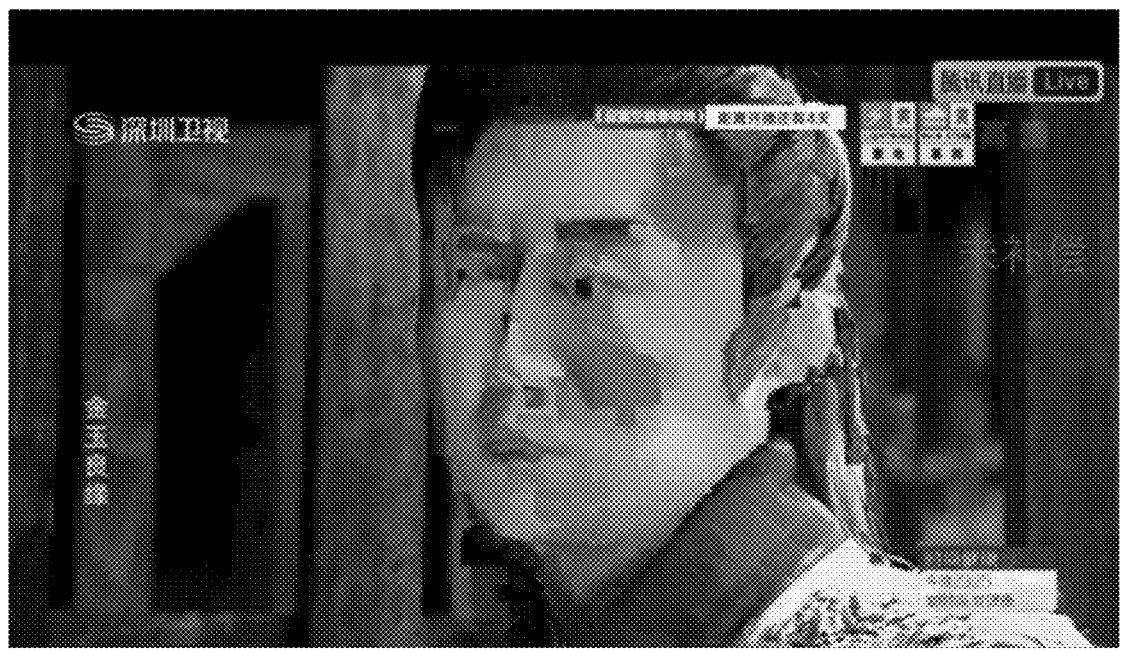
FIG. 12 shows a diagram of comparison between a playback effect at a playback end before video frame compensation and a playback effect at the playback end after video frame compensation according to an embodiment.
Figure 13:
FIG. 13 shows a diagram of comparison between a playback effect at a playback end before video frame compensation and a playback effect at the playback end after video frame compensation according to an embodiment.

By means of the video processing apparatus, the video frame queue is formed by separately numbering each video frame. The video frames are distinguished according to a self-defined protocol, and lost frame detection and compensation are directly performed at a data layer of video frame transmission, so as to implement complete lost frame compensation when frame loss cannot be avoided by using another method for reducing frame loss. The video processing apparatus is run in a server in a video transmission acceleration node of a video playback architecture, and compensation is performed at the data layer, with no need to perform additional encoding/decoding and without increasing a load of the server. Lost frame compensation is performed by means of frame insertion at an interval by using a copied neighboring video frame as a compensation frame, so that a visual and audio effect of a video is superior to that of the video when frame loss occurs and is not compensated for. As shown in FIG. 12 and FIG. 13, FIG. 12 and FIG. 13 are diagrams of comparison between a video playback image obtained at a playback end when frame loss occurs and is not compensated for and a video playback image obtained after lost frame compensation by using the video processing method. Lost frame compensation ensures that a total quantity of video frames is not changed, and ensures a video playback speed of the playback end. For an online network video, and in particular, a live video, because of a decrease in a quantity of video frames caused by frame loss, the playback speed of the playback end may exceed a speed at which a live signal is generated, causing a playback failure. By means of the video processing apparatus, normal smooth playback of the live video can be ensured.

A person of ordinary skill in the art may understand that all or some of the processes of the methods in the embodiments may be implemented by a computer program instructing relevant hardware. The program may be stored in a computer-readable storage medium. When the program runs, the processes of the embodiments of the foregoing methods may be included. The foregoing storage medium may be a magnetic disk, an optical disc, a read-only memory (ROM), a random access memory (RAM), or the like.

Correspondingly, an embodiment of the present disclosure further provides a computer storage medium storing a computer program, and the computer program is used for performing the video processing method in the embodiments of the present disclosure.

The foregoing embodiments are merely several implementations of the present disclosure, which are described in a relatively specific and detailed manner. However, this should not be constructed as a limitation to the scope of the present disclosure. It should be noted that, a person of ordinary skill in the art may make various changes and improvements without departing from the ideas of the present disclosure, which shall all fall within the protection scope of the present disclosure.

What is claimed is:

1. A video processing method, comprising:
obtaining a video frame queue generated to include a plurality of video frames that are each separately numbered prior to transmission of the video frame queue to a remote playback device;
initiating, by a video source device, transmission of at least a portion of the video frame queue to the remote video playback device;
detecting, by the video source device and during the transmission of the video frame queue, whether a video frame not yet transmitted in the video frame queue is lost;
generating a compensated video frame queue based on the video frame queue by:
obtaining, from the video frame queue, a neighboring video frame that neighbors the lost video frame within the video frame queue;
using a duplicate of the neighboring video frame as the compensation video frame; and
inserting the compensation video frame into the video frame queue at a position of a lost frame to compensate for the lost video frame; and transmitting, by the video source device, the compensated video frame queue to the remote video playback device.

2. The video processing method according to claim 1, wherein:
obtaining the video frame queue comprises:
obtaining the video frame queue including a plurality of video frames that are each assigned a distinct number according to a chronological order in which the video frames are generated; and
detecting whether the video frame in the video frame queue is lost during transmission comprises:
detecting, during the transmission of the video frame queue, whether a number assigned to a video frame included in the video frame queue is missing or erroneous; and
determining that the video frame corresponding to the missing or erroneous number is the lost video frame when the number assigned to the video frame is detected to be missing or erroneous.

3. The video processing method according to claim 1, wherein obtaining the neighboring video frame and using the neighboring video frame as the compensation video frame comprises:
determining whether a plurality of sequential video frames are lost;
copying a video frame that is sequentially before and neighboring the lost video frame as the compensation video frame when there is determined to be one or more nonsequential lost video frames; and
separately copying video frames that neighbor the lost video frames and of which a quantity is a same as a quantity of the lost videos frames as compensation video frames when there is a plurality of sequential lost video frames.

4. The video processing method according to claim 1, wherein before obtaining the video frame queue, the method further comprises:
separately adding a corresponding video protocol head to each video frame, and numbering the video protocol head, to generate the video frame queue; and
before transmitting the compensated video frame queue, deleting the video protocol head for each video frame in the video frame queue.

5. A video processing source apparatus comprising:
a network interface configured to communicate with a remote video playback device;
a memory storing processor-executable instructions; and
a processor in communication with the network interface and the memory, wherein the processor is configured to execute the processor-executable instructions stored on the memory to:
obtain a video frame queue generated to include a plurality of video frames that are each separately numbered prior to transmission of the video frame queue to the remote playback device;
control the network interface to initiate transmission of at least a portion of the video frame queue from the video processing source apparatus to the remote video playback device;
detect, during the transmission of the video frame queue, whether a video frame included in the video frame queue is lost;
generate a compensated video frame queue based on the video frame queue by:

obtaining, from the video frame queue, a neighboring video frame that neighbors the lost video frame within the video frame queue;
using a duplicate of the neighboring video frame as the compensation video frame; and
inserting the compensation video frame into the video frame queue at a position of a lost frame to compensate for the lost video frame; and
control the network interface to transmit the compensated video frame queue from the video processing source apparatus to the remote video playback device.

6. The video processing apparatus according to claim 5, wherein the processor is configured to execute the processor-executable instructions to obtain the video frame queue by assigning a distinct number to each video frame according to a chronological order in which the video frames are generated; and
wherein the processor is configured to execute the processor-executable instructions to detect whether the video frame included in the video frame queue is lost during transmission by:
detecting, during the transmission of the video frame queue, whether a number assigned to a video frame included in the video frame queue is missing or erroneous; and
determining that the video frame corresponding to the missing or erroneous number is the lost video frame when the number assigned to the video frame is detected to be missing or erroneous.

7. The video processing apparatus according to claim 5, wherein the processor is further configured to execute the processor-executable instructions to:
determine whether a plurality of sequential video frames are lost;
copy a video frame that is sequentially before and neighboring the lost video frame as the compensation video frame when there is determined to be one or more nonsequential lost video frames; and
separately copy video frames that neighbor the lost video frames and of which a quantity is a same as a quantity of the lost videos frames as compensation video frames when there is a plurality of sequential lost video frames.

8. The video processing apparatus according to claim 5, wherein the processor is further configured to execute the processor-executable instructions to:
separately add a corresponding video protocol head to each video frame, and number the video protocol head, to generate the video frame queue; and
before controlling the network interface to transmit the compensated video frame queue to the remote video playback device, delete the video protocol head for each video frame in the video frame queue.

9. A non-transitory computer storage medium, the non-transitory computer storage medium storing processor executable instructions that, when executed by a processor, cause the processor to:
obtain a video frame queue generated to include a plurality of video frames that are each separately numbered prior to transmission of the video frame queue to the remote playback device;
initiate, by a video source device, transmission of at least a portion of the video frame queue to a remote video playback device;
detect, by the video source device and during the transmission of the video frame queue, whether a video frame in the video frame queue is lost;

generate a compensated video frame queue based on the video frame queue by:
  obtaining, from the video frame queue, a neighboring video frame that neighbors the lost video frame within the video frame queue;
  using a duplicate of the neighboring video frame as the compensation video frame; and
  inserting the compensation video frame into the video frame queue at a position of a lost frame to compensate for the lost video frame; and
transmit, by the video source device, the compensated video frame queue to the remote video playback device.

10. The non-transitory computer storage medium according to claim 9, wherein the processor executable instructions, when executed by a processor, cause the processor to:
obtain the video frame queue by:
  obtaining the video frame queue including a plurality of video frames that are each assigned a distinct number according to a chronological order in which the video frames are generated; and
detect whether the video frame in the video frame queue is lost during transmission by:
  detecting, during the transmission of the video frame queue, whether a number assigned to a video frame included in the video frame queue is missing or erroneous; and
  determining that the video frame corresponding to the missing or erroneous number is the lost video frame when the number assigned to the video frame is detected to be missing or erroneous.

11. The non-transitory computer storage medium according to claim 9, wherein the processor executable instructions, when executed by a processor, cause the processor to obtain the neighboring video frame and use the neighboring video frame as the compensation video frame by:
  determining whether a plurality of sequential video frames are lost;
  copying a video frame that is sequentially before and neighboring the lost video frame as the compensation video frame when there is determined to be one or more nonsequential lost video frames; and
  separately copying video frames that neighbor the lost video frames and of which a quantity is a same as a quantity of the lost videos frames as compensation video frames when there is a plurality of sequential lost video frames.

12. The non-transitory computer storage medium according to claim 9, wherein the processor executable instructions, when executed by a processor, cause the processor to, before obtaining the video frame queue:
  separately adding a corresponding video protocol head to each video frame, and numbering the video protocol head, to generate the video frame queue; and
  before transmitting the compensated video frame queue, deleting the video protocol head for each video frame in the video frame queue.

* * * * *